United States Patent [19]

Tanahashi

[11] 4,289,094
[45] Sep. 15, 1981

[54] TWO-STROKE CYCLE GASOLINE ENGINE
[75] Inventor: Toshio Tanahashi, Toyota, Japan
[73] Assignee: Toyota Jidosha Kogyo Kabushiki Kaisha, Aichi, Japan
[21] Appl. No.: 71,491
[22] Filed: Aug. 31, 1979
[51] Int. Cl.³ .............................................. F02B 1/08
[52] U.S. Cl. ............................ 123/69 R; 123/73 CC;
123/73 AF; 123/433; 123/324; 123/51 B;
123/51 BD
[58] Field of Search .......... 123/324, 432, 433, 73 AF,
123/73 CB, 73 CC, 69 R, 51 B, 51 BD, 51 BA

[56] References Cited
U.S. PATENT DOCUMENTS

| | | | |
|---|---|---|---|
| 976,858 | 11/1910 | Easthope, Jr. | 123/73 CC |
| 1,183,688 | 5/1916 | Snyder | 123/73 CC |
| 1,722,951 | 7/1929 | Barkey | 123/73 CC |
| 2,406,491 | 8/1946 | DeWaern | 123/73 CC |
| 3,680,305 | 8/1972 | Miller | 123/73 CC |
| 4,191,141 | 3/1980 | Franke | 123/73 CC |

*Primary Examiner*—Wendell E. Burns
*Attorney, Agent, or Firm*—Stevens, Davis, Miller & Mosher

[57] ABSTRACT

A two-stroke cycle gasoline engine having a first scavenging port which is supplied with fuel-air mixture through a mixture passage, and a second scavenging port which is supplied with air, wherein supply of fuel-air mixture through the mixture passage is substantially throttled while supply of air through the second scavenging port is interrupted, so as to perform stratified scavenging, when the engine is operating at low load, while in medium to high load operation the throttling of the mixture passage is released while air is injected through said second scavenging port, so as to generate swirling of mixture charged in the cylinder chamber.

12 Claims, 6 Drawing Figures

TWO-STROKE CYCLE GASOLINE ENGINE

BACKGROUND OF THE INVENTION

The present invention relates to a two-stroke cycle engine, and, more particularly, to a two-stroke cycle gasoline engine adapted for use with automobiles.

A two-stroke cycle engine has theoretically the advantage that it can generate greater power for its size when compared with a four-stroke cycle engine, because the two-stroke cycle engine has twice as many work strokes per revolution as the four-stroke cycle engine. However, a conventional two-stroke cycle engine such as a two-stroke cycle gasoline engine which employs fuel-air mixture for scavenging has the drawback that it has high fuel consumption as compared with a four-stroke cycle engine, due to the loss of fuel-air mixture caused by the direct escape, i.e. blow-out, of scavenging mixture to the exhaust manifold during scavenging, in addition to the common drawback of two-stroke cycle engines that it cannot generate such a high power as expected from the fact that it has twice as many work strokes as the corresponding four-stroke cycle engine, due to the fact that the scavenging is still insufficient. Further, when the direct escape of scavenging mixture to the exhaust manifold occurs, HC content of exhaust gases increases, thereby making the problem of atmospheric contamination more serious.

In conventional two-stroke cycle gasoline engines, the rate of blow-out of scavenging mixture increases as the engine load or the delivery ratio increases, so that a large amount of HC is discharged in high load operation of the engine. On the other hand, in low load operation of the conventional two-stroke cycle gasoline engine, although the blow-out of scavenging mixture does not occur because delivery ratio is low and trapping efficiency is high, scavenging efficiency is low and a large amount of exhaust gases remain in the cylinder chamber, whereby fresh fuel-air mixture is much diluted by these remaining exhaust gases and is made less combustible, whereby combustion of this fuel-air mixture in the cylinder chambers becomes unstable, thereby causing torque fluctuation, power reduction, and increase of fuel consumption, so that the overall performance of the engine is much deteriorated. Further, in such operation of the engine a large amount of uncombusted fuel is discharged from the engine, so that the problem of HC contamination again becomes serious.

With respect to a two-stroke cycle gasoline engine it is known that, if scavenging fuel-air mixture is brought into contact with hot exhaust gases remaining in the cylinder during scavenging, a part of the fuel is decomposed by the heat of the exhaust gases so as to generate radicals such as C2, CH, OOH, COH, and H, which can self-ignite when compressed during the compression stroke of the engine. If this decomposition of fuel is available, stable combustion of fuel is ensured even in low load operation of the engine, whereby the aforementioned problems due to unstable combustion are completely obviated. In this connection, it is also known that, in fact, two-stroke cycle gasoline engines sometimes operate in low load high speed operation without depending upon ignition by an ignition plug. However, in most of these cases the real situation is not self-ignition by the generation of radicals, but is actually hot-spot ignition due to a hot spot generated in the wall of the combustion chamber due to some local overheating in the combustion chamber.

SUMMARY OF THE INVENTION

In view of the above problems, and in consideration of various considerations with regard to supply of fresh fuel-air mixture and venting of exhaust gases in scavenging of two-stroke cycle gasoline engines, the present inventor contemplates to improve combustion of fuel-air mixture in low load operation of two-stroke cycle gasoline engines, by developing thermal decomposition of fuel so as to generate more radicals, depending upon judicious control of supply of scavenging fuel-air mixture into the cylinder chamber.

In this connection, it is known to be effective for promoting thermal decomposition of fuel that scavenging fuel-air mixture should be charged in the cylinder chamber so as to form a stratified layer adjacent to the layer of exhaust gases which still remain in the cylinder chamber after initial discharge of exhaust gases upon opening of an exhaust port. In this regard, the inventor notes that the initial injection of scavenging fuel-air mixture, which generally takes place with the highest pressure of scavenging fuel-air mixture at the moment that a scavenging port is initially opened, forms a strong swirl flow in the cylinder chamber which affects very disadvantageously formation of a stratified layer of fuel-air mixture adjacent to the layer of exhaust gases remaining in the cylinder chamber.

Based upon this recognition, it is the primary object of the present invention to reduce the power of the initial injection of fuel-air mixture from the scavenging port in low load operation of two-stroke cycle gasoline engines, when there is the chance of improving combustion of the fuel by thermal decomposition of it.

However, in medium to high load operation, it is no longer possible to form a stratified layer of fuel-air mixture adjacent to the layer of exhaust gases while generating a required high output power. In this case, therefore, it is desirable that scavenging should be performed strongly from its beginning, so as to accomplish a required high volumetric efficiency, while seeking for as high a trapping efficiency or a scavenging efficiency as possible, and that the fuel-air mixture charged in the cylinder chamber should be formed into highly turbulent flows so as to promote propagation of combustion initiated by the spark plug to the entire region of the mixture charged in the cylinder chamber.

In view of this, it is a further object of the present invention to perform scavenging in medium to high load operation of two-stroke cycle gasoline engines in such a two-stage manner that first scavenging is performed by air injected from a first inlet port, which is not effectively operated in low load operation of the engine, so as to form the front region of the scavenging medium which is more subject to direct escape through the exhaust port, and thereafter fuel-air mixture is injected into the cylinder chamber so as to back up the initial scavenging air layer and to remain in and fill the cylinder chamber with fresh fuel-air mixture.

In accordance with the present invention, the above-mentioned objects are accomplished by a two-stroke cycle gasoline engine comprising a cylinder bore, a piston slidably received in said cylinder bore so as to define a cylinder chamber, an exhaust port which opens from said cylinder chamber towards the atmosphere, a first scavenging port which injects fuel-air mixture into said cylinder chamber, a second scavenging port which injects air into said cylinder chamber, a first passage which conducts fuel-air mixture towards said first scavenging port, a second passage which conducts air towards said second scavenging port, a controller, a first control valve which is controlled by said controller and controls said first passage so as to throttle it when engine load is below a predetermined value, and a second control valve which is controlled by said controller and controls said second passage so as substantially to interrupt it when engine load is below a predetermined value.

BRIEF DESCRIPTION OF THE DRAWINGS

The present invention will become more fully understood from the following descriptions of some preferred embodiments, made with reference to the accompanying drawings, which are given by way of illustration only, and thus are not limitative of the present invention, and wherein.

DESCRIPTION OF THE PREFERRED EMBODIMENTS

Figure 1:
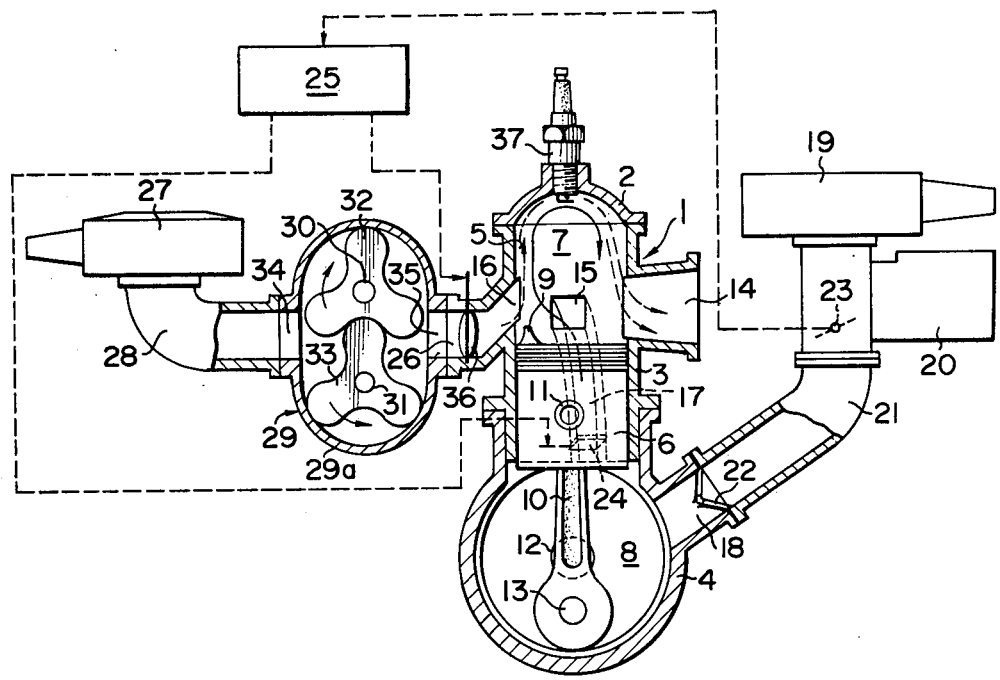
FIG. 1 is a diagrammatical longitudinal sectional view showing an embodiment of the two-stroke cycle gasoline engine of the present invention.
Figure 2:
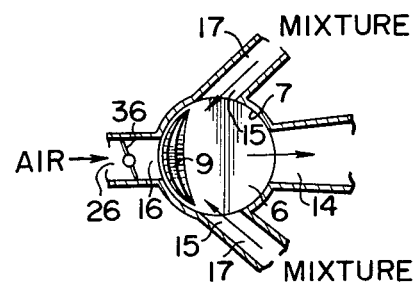
FIG. 2 is a diagrammatical cross-sectional view of the cylinder chamber of the engine shown in FIG. 1.

Referring first to FIGS. 1 and 2, the engine herein shown comprises an engine case 1 which is an assembly of a cylinder head 2, a cylinder block 3 and a crankcase 4. In the engine case is formed a cylinder bore 5, in which is slidably received a piston 6, so as to define a cylinder chamber 7 in the cylinder bore 5 which is confined by the wall of the cylinder bore 5, the inner wall of the cylinder head 2, and the upper surface of the piston 6. In the crankcase 4 is defined a crank chamber 8, which co-operates with the piston 6 so as to perform crankcase compression of fuel-air mixture as explained hereinunder. A deflector 9 is provided on the upper surface of the piston 6.

The piston 6 is connected with one end of a connecting rod 10 by a piston pin 11, while the other end of the connecting rod is connected with a crankpin 13 of a crankshaft 12. In this case, it is desirable that the above-mentioned cylinder—piston assembly should be so designed that its compression ratio is in the range 4—10.

The cylinder block 3 is formed with an exhaust port 14, loop scavenging ports 15, and a cross scavenging port 16, each opening towards the cylinder bore in the region of the cylinder chamber 7. In this embodiment the loop scavenging port 15 is formed as skewed with respect to the central axis of the cylinder bore so as to generate a swirl flow by the scavenging medium ejected from this port. As better shown in FIG. 2, the loop scavenging ports 15 are provided at opposite sides of the exhaust port 14 so as to be symmetrical with respect to a plane which includes the central axis of the cylindrical bore 5 and that of the exhaust port 14. As understood from FIGS. 1 and 2, the ports 15 are adapted to eject fuel-air mixture towards an upper region of the cylinder chamber 7, and towards the opposite side of the exhaust port 14 with respect to the central axis of the cylinder bore, so that the fuel-air mixture ejected from these ports 15 flows along a looped scavenging path towards the exhaust port.

The cross scavenging port 16 opens in the inner wall of the cylinder chamber at a position which diametrically opposes the exhaust port 14. It is desirable that the axis of this port should be inclined towards the top of the cylinder chamber so as to make the scavenging air ejected therefrom flow across the cylinder chamber in a more effective manner for scavenging. The deflector 9 provided on the upper face of the piston 6 presents a convex curved surface towards the cross scavenging port 16, the curved surface being formed to be arcuate along the cylindrical inner surface of the cylinder chamber 7, as understood from FIG. 2. The deflector 9 has another concave curved surface on its other side from the first mentioned curved surface. As a result, the deflector 9 shows a crescent shape when viewed from its top, as seen in FIG. 2.

The loop scavenging ports 15 are connected with the crank chamber 8 by way of passages 17, so as to be supplied with scavenging mixture compressed in the crank chamber. The crankcase 4 has a mixture intake port 18, which is supplied with fuel-air mixture generated by a carburetor 20 through a passage 21 and a reed valve 22. The carburetor 20 takes in air through an air cleaner 19 and includes a throttle valve 23, and other conventional devices such as a fuel nozzle, fuel supply passages, etc., which are not shown in the drawing. Further, it is desirable that the carburetor 20 should incorporate an auxiliary fuel supply system which modifies air/fuel ratio of the mixture generated by the carburetor.

In each of the passages 17 which conducts fuel-air mixture from the crank chamber 8 to each of the ports 15 is provided a control valve 24. In this case, it is desirable that the control valves 24 should be located in proximity to the crank chamber 8, or in other words that the control valves should be located as remote from the ports 15 as possible, so that turbulence generated by the control valves 24 in the flows of fuel-air mixture conducted through the passages 17 substantially disappear before the flows reach the ports 15. The control valves 24 operate in accordance with a control signal received from a controller 25 so as selectively to throttle the passages 17.

The cross scavenging port 16 is supplied with compressed air through an air cleaner 27, a passage 28, an air compressor 29, and a passage 26. As apparent from FIG. 1, the cross scavenging port 16 is shifted towards the top dead center position of the piston relative to the loop scavenging ports 15, so that the port 16 is opened to the cylinder chamber 7 in advance of the ports 15 in the crank angle diagram. In this embodiment, the air compressor 29 is a Roots blower, which has a pump casing 29a and two Roots rotors 32 and 33 which rotate in opposite directions as shown by arrows associated with their rotary shafts 30 and 31, respectively. In accordance with the rotation of the Roots rotors, air is drawn through inlet port 34 of the pump 29 and is discharged from its delivery port 35 towards the passage 26. It is desirable that the air pump 29 should have an air relief valve.

In the passage 26 is provided an air control valve 36 which controls the passage 26 in accordance with a control signal received from the controller 25, so as selectively to interrupt the passage 26.

The controller 25 receives a signal which indicates the amount of opening of the throttle valve 23, and dispatches control signals towards the mixture control valves 24 and the air control valve 36. The mixture control valves 24 are maintained in proximity to their full closed position so as to throttle the passages 17 as long as the opening of the throttle valve 23 is not more than a predetermined opening which effects a predetermined low load operation of the engine. When the throttle valve 23 is opened more than said predetermined opening, the mixture control valves 24 are opened to their fully opened positions. While the throttle valve 23 is opened beyond this opening, the mixture control valves 24 are maintained at their full opened positions. On the other hand, the air control valve 36 is maintained at its fully closed position until the throttle valve 23 is opened beyond said predetermined opening, and when the throttle valve 23 is further opened, or, in accordance with this, when the mixture control valves 24 are opened to their fully opened positions, the air control valve 36 is gradually opened so as to effect primary air scavenging prior to the scavenging by fuel-air mixture.

In the cylinder head 2 is mounted an ignition plug 37.

The two-stroke cycle gasoline engine explained above operates as follows:

As the piston 6 ascends as viewed in FIG. 1, air is drawn through the air cleaner 19 into the carburetor 20 and fuel-air mixture therein generated is drawn through the passage 21, the reed valve 22, and the mixture inlet port 18 into the crank chamber 8. Thereafter, as the piston descends, also as viewed in FIG. 1, the fuel-air mixture in the crank chamber 8 is compressed. Further, when the engine is operating, the Roots rotors 32 and 33 of the Roots blower 29 are driven by the crankshaft of the engine so as to supply compressed air toward the cross scavenging port 16.

When the engine is operating at low load, with the throttle valve 23 not opened beyond said predetermined opening, the mixture control valves 24 are substantially throttled, while the air control valve 36 is fully closed so as to interrupt the air passage 26. In this condition, when the piston descends from its top dead center towards its bottom dead center, it first uncovers the exhaust port 14, whereby high pressure combustion gases in the cylinder chamber 7 are discharged vigorously through the exhaust port 14 due to their own high pressure, although of course the cylinder chamber still remains occupied by exhaust gases. Then, as the piston further descends, it uncovers the cross scavenging port 16. In this case, however, since the air passage 26 is interrupted by the air control valve 36, no scavenging by air is performed. As the piston further descends, it finally uncovers the loop scavenging ports 15, whereby the fuel-air mixture compressed in the crank chamber 8 is injected into the cylinder chamber through the loop scavenging ports 15. In this case, since the mixture passages 17 which conduct fuel-air mixture from the crank chamber 8 to the loop scavenging ports 15 are substantially throttled by the mixture control valves 24, injection of fuel-air mixture into the cylinder chamber is moderately performed so as gradually to replace the exhaust gases remaining in the cylinder chamber by a stratified layer of exhaust gases.

In this case, since as mentioned above the mixture control valves 24 are located adjacent to the inlet end of the mixture conducting passages 17, turbulences generated in the flows of fuel-air mixture by the mixture control valves 24 disappear before the flows of fuel-air mixture are discharged from the loop scavenging ports 15, whereby in such low load operation of the engine the flows of fuel-air mixture ejected from the loop scavenging ports 15 form a smooth flow of fuel-air mixture in the cylinder chamber 7 as diagrammatically shown by a solid curved line in FIG. 1. By this stratified scavenging of the cylinder chamber the fuel located in the front region of the layer of fuel-air mixture is strongly heated by the exhaust gases remaining in the cylinder chamber. This stratified condition of fuel-air mixture and exhaust gases can be maintained even during the compression stroke which subsequently occurs, so that fuel located at the front region of the layer of fuel-air mixture is strongly heated by the exhaust gases and is thermally decomposed so as to generate radicals such as C2, CH, OOH, CHO, and H. When the fuel-air mixture including an effective amount of these radicals is subject to adiabatic compression, it automatically ignites and burns swiftly.

In this connection, the skewed arrangement of the loop scavenging ports 15 and of the deflector 9 is so adapted that the flows of fuel-air mixture ejected from the ports 15 in low load operation of the engine are conducted substantially towards the central region of the cylinder chamber 7 so that the layer of fuel-air mixture charged in the cylinder chamber is isolated from cooling by the wall of the cylinder chamber and is more effectively heated by the exhaust gases remining in the cylinder chamber. Further, it is desirable that the carburetor 20 should be so adjusted that it produces fuel-air mixture having air/fuel ratio in the range 6–20 so that it can compensate for variation of air/fuel ratio caused by the air scavenging.

As engine load increases with increase of the amount of opening of the throttle valve 23, in spite of the provision of the mixture control valves 24, the speed of fuel-air mixture flowing into the cylinder chamber inevitably increases, and at a medium load the turbulence generated in the fuel-air mixture charged in the cylinder chamber becomes so strong that, due to mixing up of fuel-air mixture and exhaust gases in the cylinder chamber which substantially reduces the temperature of exhaust gases, thermal decomposition of fuel no longer occurs. At and above this load the mixture control valves 24 are fully opened, and the air control valve 36 is also opened, so as to supply air compressed by the air pump 29 through the cross scavenging port 16.

When the cross scavenging port 16 is opened, since it is opened prior to the loop scavenging ports 15, the cylinder chamber 7 is primarily scavenged by air before scavenging by or charging of fuel-air mixture is started. In this case, the air ejected from the port 16 is deflected by the deflector 9 upward as viewed in FIG. 1, so as to flow along the wall surfaces which define the upper portion of the cylinder chamber and to scavenge peripheral portions of the cylinder chamber including every nook and cranny thereof. Subsequent to this primary scavenging by air, the loop scavenging ports 15 are opened, and fuel-air mixture is injected into the cylinder chamber through these ports. In medium to high load operation, the flow velocity of the fuel-air mixture injected through the ports 15 is relatively high, due to increase of the amount of fuel-air mixture and due to removal of the restriction applied by the mixture control valves 24, so that the flows of fuel-air mixture ejected from the ports 15 flow upwards in the figure, while colliding with each other and joining with the flow of air discharged from the port 16, thereby generating turbulent swirling flows of fuel-air mixture in the cylinder chamber 7, which gradually grow and push the exhaust gases remaining in the cylinder chamber out of the exhaust port 14.

These turbulences of fuel-air mixture are maintained during the subsequent compression stroke, and, when the fuel-air mixture is ignited by the ignition plug 37 at the end of the compression stroke, combustion flame rapidly propagates over the entire region of the combustion chamber by the action of the turbulences, and the desirable combustion of fuel-air mixture is accomplished. In this case, since the fuel-air mixture supplied from the carburetor 20 is somewhat diluted by the air supplied from the air compressor 29, it is desirable that the fuel-air mixture generated by the carburetor 20 in medium to high load operation should be somewhat richer than in low load operation, so that the air/fuel ratio should be in the range 6—16.

Figure 3:
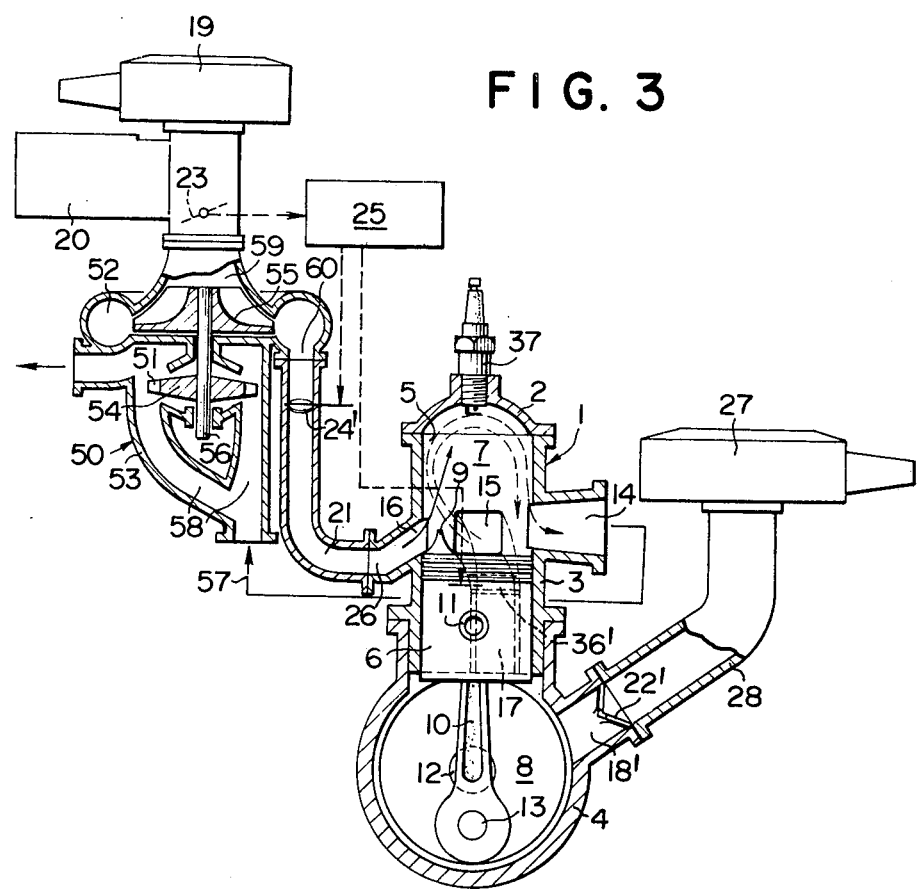
FIG. 3 is a view similar to FIG. 1, showing another embodiment of the present invention.
Figure 4:
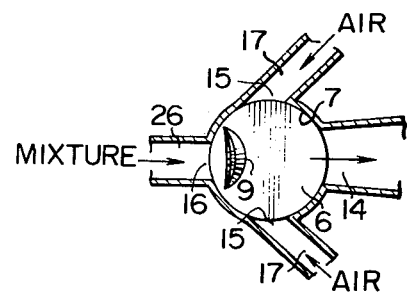
FIG. 4 is a diagrammatical cross-sectional view of the cylinder chamber of the engine shown in FIG. 3.

FIG. 3 is a view similar to FIG. 1, showing another embodiment of the two-stroke cycle gasoline engine of the present invention, and FIG. 4 is a diagrammatical cross-sectional view of the cylinder chamber of the engine shown in FIG. 3. In FIGS. 3 and 4, the portions corresponding to those shown in FIGS. 1 and 2 are designated by the same reference numerals. In this embodiment, the loop scavenging ports 15 are supplied with air, while the cross seavenging port 16 is supplied with fuel-air mixture. Therefore, in order to perform primary scavenging by air prior to scavenging by fue-lair mixture, the loop scavenging ports 15 are adapted so as to be uncovered by the piston 6 prior to the cross scavenging port 16.

The crankcase 4 is provided with an air inlet port 18', which is supplied with air through an air cleaner 27, an air supply pipe 28, and a reed valve 22'. In air conducting passages 17, which conduct air compressed in the crank chamber 8 to the loop scavenging ports 15, are individually provided air control valves 36', which are located near the loop scavenging ports 15. The cross scavenging port 16 is supplied with fuel-air mixture from the carburetor 20 through an exhaust gas turbocharger 50 and a mixture supply pipe 21 which includes a mixture control valve 24' at its inlet end portion. The exhaust gas turbocharger 50 has a turbine chamber 51, a pump chamber 52, and a casing 53. A turbine rotor 54 is mounted in the turbine chamber 51, while a compressor rotor 55 is mounted in the pump chamber 52. The turbine rotor 54 and the compressor rotor 55 are connected with each other by a shaft 56. The turbine chamber 51 is connected with the exhaust port 14 of the engine by an exhaust gas pipe 57 and a manifold 58, so as to be supplied with exhaust gases of the engine, which drive the turbine rotor 54 while they flow across its blades. As the compressor rotor 55 is driven by the turbine rotor 54, mixture generated by the carburetor 20 is drawn into a mixture inlet port 59 of the compressor, and is compressed therein and discharged through a mixture outlet port 60 towards the mixture supply pipe 21. In this embodiment, as shown in FIG. 4, the deflector 9 provided on the upper surface of the piston 6 is curved in the opposite direction as compared with the deflector in the embodiment shown in FIGS. 1 and 2. By this oppositely curved deflector 9, the mixture discharged from the cross scavenging port 16 is conducted directly towards an upper central region of the cylinder chamber 7, without being deflected sidewards so as to flow along the wall of the cylinder chamber.

In this embodiment, the control of the mixture control valve 24' and the air control valves 36' is performed in the same manner as in the first embodiment shown in FIGS. 1 and 2. That is, when the engine is operating at low load, the mixture control valve 24' is substantially throttled, while the air control valves 36' are fully closed, so as to perform stratified scavenging by the flow of fuel-air mixture moderately injected from the cross port 16 and so as to obtain improvement of ignition and combustion of fuel-air mixture depending upon thermal decomposition of fuel. In medium to high load operation, the air control valves 36' are opened so as to perform primary scavenging of the cylinder chamber by air, and thereafter fuel-air mixture is injected through the cross port 16 at relatively high speed so as to generate turbulent flow of fuel-air mixture in the cylinder chamber while scavenging the remaining exhaust gases out of the exhaust port. In this case, by the inversely curved deflector 9, the air ejected from the loop scavenging ports 15 is judiciously deflected to flow along the wall surfaces which define the upper portion of the cylinder chamber 7, so that this primary scavenging air scavenges the peripheral portions of the cylinder chamber including every nook and cranny included therein. On the other hand, as mentioned above, fuel-air mixture ejected from the cross scavenging port 16 is deflected by the deflector 9 so as to be guided directly towards the upper central portion of the cylinder chamber.

Figure 5:
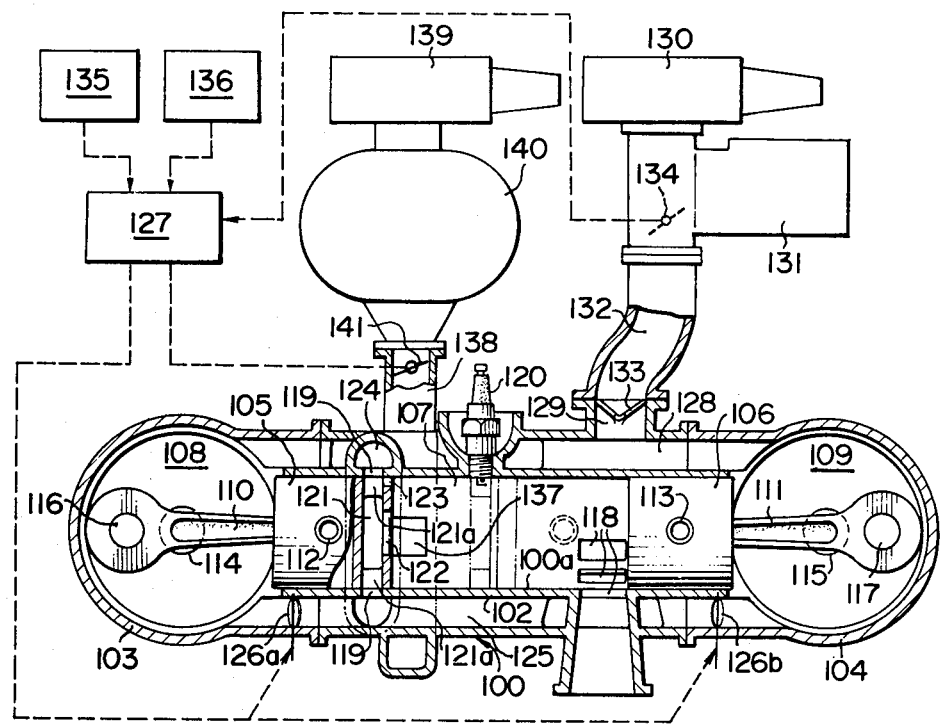
FIG. 5 is a diagrammatical longitudinal sectional view showing a still further embodiment of the engine of the present invention, constructed as an engine having two horizontally opposed pistons, and incorporating an additional control system.
Figure 6:
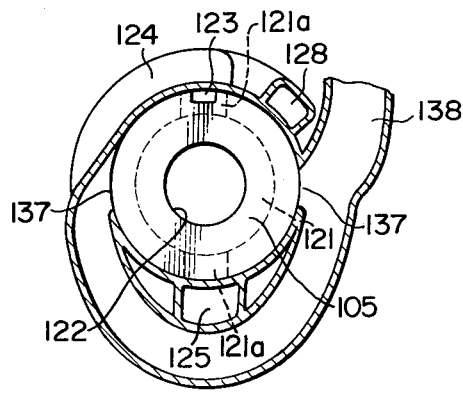
FIG. 6 is a diagrammatical sectional view of the cylinder chamber of the engine shown in FIG. 5.

FIG. 5 shows still another embodiment of the present invention, which is constructed as an engine having two opposed pistons. FIG. 6 shows diagrammatically a section of the cylinder chamber and the air scavenging passages of the engine shown in FIG. 5. The engine case 100 is composed of a cylinder block 102 and two crankcases 103 and 104, and defines a cylinder bore 100a, in which are slidably received two pistons 105 and 106 as opposed to each other. In the cylinder bore 100a, between the two pistons, is defined a cylinder chamber 107, while on the other sides of the pistons 105 and 106 are defined crank chambers 108 and 109 by co-operation of the crank cases 103 and 104, respectively. The pistons 105 and 106 are individually connected with one end of connecting rods 110 and 111 by piston pins 112 and 113. The other ends of the connecting rods 110 and 111 are individually connected with crank pins 116 and 117 of the crankshafts 114 and 115 which are individually mounted in the crankcases 103 and 104.

The cylinder block 102 has exhaust ports 118 adapted to be opened and closed by the piston 106, and also has first and second scavenging ports 119 and 137 adapted to be opened and closed by the piston 105. Slightly shifted towards the side of the piston 105 from the axial center of the cylinder block 102 is provided a spark plug 120. The first scavenging ports 119 are provided as a pair which are opposed to each other, and one of them, which is located upwards as viewed in FIG. 5, is in alignment with the spark plug 120 along a generator of the cylinder. The second scavenging ports 137 are adapted to be uncovered by the piston 105 prior to the first scavenging ports 119, as the piston 105 moves from its top dead center towards its bottom dead center, and, as shown in FIG. 6, are open towards the cylinder chamber so as to inject air tangentially along the cylindrical inner wall of the cylinder block 102.

The second scavenging ports 137 are adapted to be supplied with air from an air supply system which includes an air cleaner 139, an air compressor 140 such as a Roots blower, and an air passage 138, in which is provided an air control valve 141, which is operated by a control signal dispatched from a controller 127.

The piston 105 located on the scavenging side of the cylinder chamber is formed with a chamber 121 adjacent to its top face. This chamber 121 is so adapted that, when the piston 105 is at its bottom dead center as shown in FIG. 5, it communicates with the first scavenging ports 119 by way of connecting passages 121a provided at opposite sides of the chamber 121, and that, when the piston 105 is located at its top dead center, the chamber 121 opposes the spark gap of the spark plug 120 through one of the connecting passages 121a. Further, the chamber 121 is opened towards the cylinder chamber 107 through an opening 122 provided at a central portion of the top face of the piston. Still further, the piston 105 is formed with a groove 123 at a portion of its top edge which allows the electrode of the spark plug 120 to pass therethrough when the piston reciprocates while traversing the tip end of the spark plug.

The first scavenging ports 119 are connected with a scavenging plenum 124, which is connected with the crank chambers 108 and 109 by way of a passage 125. In the passage 125, desirably as close to the crank chambers as possible, are provided mixture control valves 126a and 126b, which are operated in accordance with a signal received from the controller 127.

The crank chambers 108 and 109 are supplied with fuel-air mixture from a mixture supply system which includes an air cleaner 130, a carburetor 131 having a throttle valve 134, passages 132, 129 and 128, and a reed valve 133 mounted in the passage 129. Of course the carburetor 131 further includes other elements such as a float chamber, fuel passages, a venturi, and a fuel nozzle.

The controller 127 in this third embodiment receives, in addition to information with regard to throttle opening from the throttle valve 134, information with regard to engine rotational speed and engine temperature from an engine speed sensor 135 and an engine temperature sensor 136, respectively, in order to produce signals for controlling the mixture control valve 126a, 126b, and the air control valve 141.

In this embodiment, the mixture control valves 126a and 126b and the air control valve 141 are controlled substantially in the same manner as described with respect to the first and second embodiments shown in FIGS. 1–4. However, the control for the control valves 126a, 126b and 141 in this embodiment is more delicate so as to consider starting-up condition of the engine. That is, when the engine is operating at low load, in the warmed up condition, the air control valve 141 is closed so as to interrupt supply of air from the second scavenging ports 137, and the mixture control valves 126a and 126b are substantially throttled, so that fuel-air mixture conducted through the throttled passage 125 to the first scavenging ports 119 is moderately introduced into the chamber 121 in the piston 105 when the piston is located at and adjacent to its bottom dead center, and then the mixture is moderately injected to the central portion of the cylinder chamber 107 through the central opening 122 formed in the top face of the piston. As fuel-air mixture is charged in this manner, it forms a stable layer adjacent to the layer of exhaust gases remaining in the cylinder chamber, whereby fuel included in the region bordering the exhaust gas layer is effectively heated by the hot exhaust gases and is thermally decomposed and generates radicals which contribute to self-ignition and swift combustion of fuel-air mixture.

However, before warming up of the engine, depending upon the engine temperature signal dispatched from the sensor, the controller 27 controls the control valves 126a, 126b and 141 in the other way, as in medium to high load operation of the engine, in which ignition relies upon the spark plug and good combustion of fuel relies upon turbulence of the fuel-air mixture.

Further, regardless of warming up condition of the engine, during starting up of the engine, which is detected by the engine rotational speed sensor 135, the control for the control valves 126a, 126b and 141 is done in the same manner as in medium to high load operation. In this connection, the control for the control valves 126a, 126b and 141 during starting up of the engine may be modified so that the mixture control valves 126a and 126b only are opened, while the air control valve 141 is closed so as to temporarily supply, as a whole, rich fuel-air mixture. This additional control system based upon engine temperature and/or engine speed may of course be additionally incorporated in the embodiments shown in FIGS. 1–4, without any substantial change of other structures or control of these engines.

When engine load increases to a medium range beyond a predetermined level, the mixture control valves 126a and 126b and the air control valve 141 are opened. In this case, when the piston 105 approaches its bottom dead center, the air scavenging ports 137 are first opened so as to inject scavenging air into the cylinder chamber so as primarily to scavenging the cylinder chamber by air. Thereafter, the mixture scavenging ports 119 communicate with the chamber 121 in the piston 105 and fuel-air mixture conducted through the passage 125 is injected into the cylinder chamber 107 through the connecting passages 121a, the chamber 121 and the central opening 122. The fuel-air mixture thus introduced into the cylinder chamber is put into swirl by air tangentially introduced into the cylinder chamber from the tangential air scavenging ports 137. This swirl flow of fuel-air mixture charged in the cylinder chamber is maintained during the subsequent compression stroke, and when the charge is ignited by the ignition plug 120 in the end of the compression stroke, flame propagates swiftly to the entire region of the swirling layer of fuel-air mixture, and improved combustion of fuel-air mixture is obtained.

Further, in this embodiment, by the provision of the chamber 121 formed in the piston 105 adjacent to its top face and the connecting passages 121a which come in direct communication with the mixture scavenging ports 119 so as to be definitely scavenged by fuel-air mixture, and which come in direct communication with the spark gap of the spark plug 120, it is ensured that the sparks generated in the spark gaps of the spark plug are in direct contact with fresh fuel-air mixture. Thus, ignition performance is definitely improved.

Although the invention has been shown and described with reference to some preferred embodiments thereof, it is to be understood that various modifications, omissions, and/or additions to the shown embodiments can be made by those skilled in the art without departing from the scope of the invention, and that therefore the invention should not be limited to the shown embodiments, but is to be defined by the following claims.

What is claimed is:

1. A two-stroke cycle gasoline engine comprising a cylinder bore, a piston slidably received in said cylinder bore so as to define a cylinder chamber, an exhaust port which opens from said cylinder chamber towards the atmosphere, a first scavenging port which has a relatively large opening area and injects fuel-air mixture into said cylinder chamber when uncovered by said piston, a second scavenging port which injects air into said cylinder chamber, a carburetor having a throttle valve for controlling engine load, a first passage which conducts fuel-air mixture from said carburetor towards said first scavenging port, a second passage which conducts air towards said second scavening port, a controller, a first control valve at a middle portion of said first passage connected to be controlled by said controller and which controls said first passage so as to throttle it when the engine load is below a predetermined relatively low value, and to open it when the engine load is above said predetermined relatively low value, and a second control valve at a middle portion of said second passage connected to be controlled by said controller and which controls said second passage so as substantially to interrupt it when engine load is below said predetermined relatively low value and to open it when the engine load is above said predetermined relatively low value.

2. The engine of claim 1, wherein said second scavenging port is opened in advance of said first scavenging port as the piston moves from its top dead center towards its bottom dead center.

3. The engine of claim 1, wherein the engine incorporates crankcase compression, and the fuel-air mixture supplied to said first scavenging port is compressed by said crankcase compression.

4. The engine of claim 3, wherein the air supplied to said second scavenging ports is compressed by a Roots blower driven by the output power of the engine.

5. The engine of claim 1, wherein the engine incorporates crankcase compression, and the air supplied to said second scavenging port is compressed by the crankcase compression.

6. The engine of claim 5, wherein the fuel-air mixture supplied to said first scavenging port is compressed by a turbocharger driven by the exhaust gases of the engine.

7. The engine of claim 1, wherein the face of the piston which delimits the cylinder chamber has a deflector which deflects air discharged from said second scavenging port so that the air flows along the inner wall of said cylinder bore.

8. The engine of claim 7, wherein a pair of said first ports are provided as opposed to each other, and said deflector has a crescent shape when viewed at right angles to said face of the piston, and has convex and concave faces, said convex face confronting said second scavenging port, while said concave face confronts said pair of first scavenging ports so as to deflect fuel-air mixture discharged from said first scavenging ports towards the central portion of the combustion chamber.

9. The engine of claim 1, wherein a pair of said second scavenging ports are provided, and the face of the piston which delimits the cylinder chamber has a deflector which has a crescent shape when viewed at right angles to said face which has convex and concave faces, said concave face confronting said first scavenging port so as to deflect fuel-air mixture discharged from said first scavenging port towards the central portion of the cylinder chamber, while said convex face confronts said pair of second scavenging ports, so as to deflect air discharged from said pair of second scavenging ports to let it flow along the inner wall of the cylinder chamber.

10. The engine of claim 1, wherein two of the pistons are provided as opposted to each other, said cylinder chamber being defined therebetween, said first and second scavenging ports being adapted to be opened and closed by one of said two pistons, while said exhaust port being adapted to be opened and closed by the other of said two pistons, and a spark plug provided as shifted towards the side of said first and second scavenging ports from the axial center of the cylinder bore, the piston which opens and closes said first and second scavenging ports being provided with a chamber which communicates to said first scavenging port when the piston is in its bottom dead center, said chamber directly communicating to said spark plug when the piston is in its top dead center and being opened to the cylinder chamber through the central portion of the top face of the piston.

11. The engine of any one of the preceding claims, wherein said controller is adapted to control said first and second control valves according to engine temperature so as to open them when engine temperature is below a predetermined value.

12. The engine of any one of claims 1–10, wherein said controller is adapted to control said first and second control valves according to rotational speed of the engine so as to open them when engine rotational speed is very low, as during starting up of the engine.

* * * * *